Patented Apr. 3, 1951

2,546,997

UNITED STATES PATENT OFFICE 2,546,997

PERFLUORO CARBON COMPOUNDS

Carl I. Gochenour, Niagara Falls, N. Y., assignor to Hooker Electrochemical Company, Niagara Falls, N. Y., a corporation of New York No Drawing. Application September 5, 1947, Serial No. 772,461

14 Claims. (Cl. 260—653)

My invention relates more particularly to perfluoro carbon compounds having an acetylenic linkage or triple bond.

To the best of my knowledge and belief, this class of compounds is entirely new. However, acetylene is sometimes known as "ethyne." I will therefore use the suffix "yne" to distinguish my products from the olefins and diolefins. As thus designated, my invention contemplates production of such compounds as the following:

Difluoro ethyne ($CF\vdots CF$)
Tetrafluoro propyne ($CF\vdots CCF_3$)
Hexafluoro-2-butyne ($CF_3\vdots CCF_3$)
Hexafluoro-1-butyne ($FC\vdots CCF_2CF_3$)
Octafluoro-2-pentyne ($CF_3C\vdots CCF_2CF_3$)
Octafluoro-1-pentyne ($CF\vdots CCF_2CF_2CF_3$)
Decafluoro-3-hexyne ($CF_3CF_2C\vdots CCF_2CF_3$)
Decafluoro-2-hexyne ($CF_3C\vdots CCF_2CF_2CF_3$)
Decafluoro-1-hexyne ($CF\vdots CCF_2CF_2CF_2CF_3$)

This list of compounds is given for purpose of illustration and is not intended to be limitative.

As an illustration of my process, I will describe it as exemplified by production of hexafluoro-2-butyne.

In co-pending application Serial No. 593,775, filed May 14, 1945, now Patent No. 2,436,357, issued February 17, 1948, there is described a process for production of hexafluorodichlorobutene, by reaction of hexachlorobutadiene with hydrofluoric acid, or equivalent fluorinating agent, as follows:

(1)
$$CCl_2:CClCCl:CCl_2 + 6HF \rightarrow CF_3CCl:CClCF_3 + 6HCl$$

I have now discovered that the product of reaction 1 may be dechlorinated by reaction with a dehalogenation agent having a selective affinity for the halogen attached to the carbon atoms which are linked by a double bond, such as finely divided zinc, in a medium such as alcohol, e. g. ethyl alcohol, presumably as follows:

$$CF_3CCl:CClCF_3 + Zn \rightarrow CF_3C\vdots CCF_3 + ZnCl_2 \quad (2)$$

Example

Into a two gallon stainless steel reaction vessel, provided with an agitator, a packed exit column 2½ feet long, a reflux condenser cooled with "dry ice" in methanol, and a receiver cooled with "dry ice," were charged 3,000 ml. of 95 per cent ethyl alcohol and 1,126 grams of powdered zinc. These materials were brought to 70° C., by means of an oil bath. With the agitator operating, 1,640 grams of 2,3 dichloro 1,1,1,4,4,4, hexafluorobutene were introduced gradually, over a period of 12 hours. During the first two hours all vapors were condensed and refluxed. When the temperature at the top of the column had reached −20° C., the vapors were allowed to pass over into the receiver and there condensed. When all the reagent had been added, the temperature was raised to 90° C., and the agitation continued for a further period of one hour, until the reaction was complete, as indicated by rising vapor temperature.

The crude product collected was treated with phosphorous pentoxide to remove traces of alcohol, and then distilled, yielding 773 grams of a material having a boiling range between minus twenty-four and plus seven degrees centigrade.

Analysis of the purified product showed it to contain 69.7 per cent fluorine, but no chlorine, and to have a molecular weight of 164 which corresponds closely to $C_4F_6$.

The product was fractionated and found to consist of major fraction (740 grams) boiling at −24° to −23° C., and a minor fraction (33 grams) boiling at 0° to 7° C. A compound having the analysis $C_4F_6$ and boiling at 6.1° C. has been described by Miller et al. (I. and E. Chem., vol. 39, No. 3, March 1947). It was reported to have the following structure:

$$CF_2:CFCF:CF_2$$

Another compound having the analysis $C_4H_6$ and boiling at 1.13° C. has been described by Henne et al. (J. A. C. S., vol. 69, February 1947, p. 280). This was reported to have the following structure:

$$\begin{array}{c} F \quad F \\ C=C \\ | \quad | \\ F_2C-CF_2 \end{array}$$

When oxidized by means of potassium permanganate the minor fraction produced by my process was found to yield potassium perfluoro succinate, which could only result from reaction with a cyclic compound, as follows:

$$2C_4F_6 + 4KMnO_4 \rightarrow$$
$$2COOK.CF_2.CF_2.COOK + 4KF + 4MnO_2 \quad (3)$$

This result leads me to believe that the minor fraction produced by my process is a mixture of the hexafluorobutadiene of Miller et al. and the hexafluorocyclobutene of Henne et al., but principally the latter. In any case, the major fraction of my product is obviously neither of these previously known compounds.

The major fraction of my product when oxidized by potassium permanganate yielded two mols of potassium trifluoroacetate, presumably as follows:

$$CF_3C \vdots CCF_3 + 2KMnO_4 \rightarrow 2CF_3COOK + 2MnO_2 \quad (4)$$

This reaction shows that the major fraction of my product has the symmetrical structure assumed, as indicated in reactions 2 and 4.

The hexafluoro-2-butyne produced by reaction 2 is a stable, non-toxic colorless gas at ordinary temperature, and when condensed, a colorless liquid. It is useful as a refrigerant.

The analogous reactions for production of the other compounds listed above are as follows:

$$CFCl:CFCl + Zn \rightarrow CF \vdots CF + ZnCl_2 \quad (5)$$
$$CFCl:CClCF_3 + Zn \rightarrow CF \vdots CCF_3 + ZnCl_2 \quad (6)$$
$$CFCl:CClCF_2CF_3 + Zn \rightarrow CF \vdots CCF_2CF_3 + ZnCl_2 \quad (7)$$
$$CF_3CCl:CClCF_2CF_3 + Zn \rightarrow$$
$$CF_3C \vdots CCF_2CF_3 + ZnCl_2 \quad (8)$$
$$CFCl:CClCF_2CF_2CF_3 + Zn \rightarrow$$
$$CF \vdots CCF_2CF_2CF_3 + ZnCl_2 \quad (9)$$
$$CF_3CF_2CCl:CClCF_2CF_3 + Zn \rightarrow$$
$$CF_3CF_2C \vdots CCF_2CF_3 + ZnCl_2 \quad (10)$$
$$CF_3CCl:CClCF_2CF_2CF_3 + Zn \rightarrow$$
$$CF_3C \vdots CCF_2CF_2CF_3 + ZnCl_2 \quad (11)$$
$$CFCl:CClCF_2CF_2CF_2CF_3 + Zn \rightarrow$$
$$CF \vdots CCF_2CF_2CF_2CF_3 + ZnCl_2 \quad (12)$$

All of these compounds are obviously of the type that lend themselves to polymerization. They can also be oxidized to useful oxidation products, such as the potassium trifluoroacetate of reaction 4.

In reactions 2 and 5 to 12, it is to be understood that a suspension medium for the zinc is present. This should preferably be a solvent for zinc chloride; but for this purpose I do not wish to be limited to ethyl alcohol, as other solvents are available.

Neither do I wish to be limited to zinc as the dehalogenation agent as other agents are known, such as iron, magnesium, aluminum, etc.

In the foregoing, the halogen atoms attached to the carbon atoms that are linked by a double bond are assumed to be chlorine, but I do not wish to be limited to chlorine, as bromine is closely akin thereto.

I claim as my invention:

1. The process for treatment of perhalogenated aliphatic olefins having two adjacent carbon atoms linked by a double bond, and, attached to each of said atoms, a single halogen atom of the group consisting of chlorine and bromine, all other halogen atoms being fluorine, to substitute a triple bond for said double bond, which comprises reacting the olefin with a finely divided metal of the group consisting of iron, aluminum, magnesium and zinc, in a liquid medium inert with respect to the reaction.

2. The process for treatment of perhalogenated aliphatic olefins of two to six carbon atoms having two adjacent carbon atoms linked by a double bond, and attached to each of said atoms, a single halogen atom of the group consisting of chlorine and bromine, all other halogen atoms being fluorine, to substitute a triple bond for said double bond, which comprises reacting the olefin with a finely divided metal of the group consisting of iron, aluminum, magnesium and zinc, in a liquid medium inert with respect to the reaction.

3. The process for treatment of perhalogenated aliphatic olefins of two to six carbon atoms having two adjacent carbon atoms linked by a double bond, and, attached to each of said atoms, a single chlorine atom, all other halogen atoms being fluorine, to substitute a triple bond for said double bond, which comprises agitating the olefin with finely divided metallic zinc, in a liquid medium inert with respect to the reaction.

4. The process for treatment of perhalogenated aliphatic olefins of two to six carbon atoms having two adjacent carbon atoms linked by a double bond, and attached to each of said atoms, a single chlorine atom, all other halogen atoms being fluorine, to substitute a triple bond for said double bond, which comprises agitating the olefin with finely divided iron, in a liquid medium inert with respect to the reaction.

5. The process for treatment of perhalogenated aliphatic olefins of two to six carbon atoms having two adjacent carbon atoms linked by a double bond, and, attached to each of said atoms, a single chlorine atom, all other halogen atoms being fluorine, to substitute a triple bond for said double bond, which comprises agitating the olefin with finely divided magnesium, in a liquid medium inert with respect to the reaction.

6. The process for treatment of perhalogenated aliphatic olefins of two to six carbon atoms having two adjacent carbon atoms linked by a double bond, and, attached to each of said atoms, a single chlorine atom, all other halogen atoms being fluorine, to substitute a triple bond for said double bond, which comprises reacting the olefin with the finely divided metallic zinc in a medium inert with respect to the reaction.

7. The process for treatment of perhalogenated aliphatic olefins of two to six carbon atoms having two adjacent carbon atoms linked by a double bond, and, attached to each of said atoms, a single chlorine atom, all other halogen atoms being fluorine, to substitute a triple bond for said double bond, which comprises agitating the olefin with finely divided metallic zinc in ethyl alcohol.

8. The process for treatment of 2,3 dichloro 1,1,1,4,4,4 hexafluoro-2-butene, to substitute a triple bond for the double bond, thereof, which comprises agitating it with finely divided metallic zinc, in ethyl alcohol, at 70° to 90° C., with refluxing, and collecting the product in a pressure vessel, at a temperature below −24° C.

9. As a new chemical compound, hexafluoro butyne.

10. As a new chemical compound, hexafluoro-2-butyne, boiling at −24° C. to −23° C.

11. Aliphatic fluorocarbons having a triple bond.

12. Aliphatic fluorocarbons of two to six carbon atoms having a triple bond.

13. Compounds having the general formula $C_nF_{2-n2}$ wherein $n$ is a whole number greater than one.

14. Compounds having the general formula $C_nF_{2n-2}$ wherein $n$ is a whole number from two to six.

CARL I. GOCHENOUR.

REFERENCES CITED

The following references are of record in the file of this patent:

UNITED STATES PATENTS

| Number | Name | Date |
| --- | --- | --- |
| 2,344,061 | Renoll | Mar. 14, 1944 |
| 2,401,897 | Benning | June 11, 1946 |

OTHER REFERENCES

Henne et al.: Jour. Am. Chem. Soc., vol. 67, 1906-8 (1945).